(12) United States Patent
Wang et al.

(10) Patent No.: US 12,476,784 B2
(45) Date of Patent: Nov. 18, 2025

(54) SYSTEM AND METHOD OF CLOCK AND DATA RECOVERY

(71) Applicant: Samsung Electronics Co., Ltd., Suwon-si (KR)

(72) Inventors: Michael Chung Wang, Southlake, TX (US); Neal Hays, Cupertino, CA (US); Amir Amirkhany, Sunnyvale, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 40 days.

(21) Appl. No.: 18/481,226

(22) Filed: Oct. 4, 2023

(65) Prior Publication Data

US 2024/0322994 A1  Sep. 26, 2024

Related U.S. Application Data

(60) Provisional application No. 63/454,596, filed on Mar. 24, 2023.

(51) Int. Cl.
*H04L 7/033* (2006.01)
*H03L 7/08* (2006.01)
*H03L 7/099* (2006.01)

(52) U.S. Cl.
CPC ............ *H04L 7/033* (2013.01); *H03L 7/0807* (2013.01); *H03L 7/099* (2013.01)

(58) Field of Classification Search
CPC ..... H03L 7/0807; H03L 7/099; H03L 7/0992; H03L 7/101–104; H03L 2207/06; H04L 7/033; H04L 27/2272; H04L 27/2275

USPC ........ 375/326, 327, 355, 376; 331/9, 10, 18, 331/23, 47, 60
See application file for complete search history.

(56) References Cited

U.S. PATENT DOCUMENTS

| | | | |
|---|---|---|---|
| 7,742,553 B1 | 6/2010 | Bataineh et al. | |
| 8,839,020 B2 | 9/2014 | Zhuang et al. | |
| 9,793,906 B1* | 10/2017 | Midha | H03L 7/083 |
| 11,115,178 B1* | 9/2021 | Lou | H03L 7/099 |
| 11,146,756 B2 | 10/2021 | Sambonsugi | |
| 11,460,878 B2 | 10/2022 | Saito et al. | |
| 2005/0187591 A1* | 8/2005 | Carter | A61N 1/32 607/46 |
| 2012/0086482 A1* | 4/2012 | Maheshwari | H03L 7/0998 331/109 |
| 2012/0139593 A1 | 6/2012 | Saito | |
| 2019/0274717 A1* | 9/2019 | Nott | A61B 17/22012 |
| 2019/0372578 A1* | 12/2019 | Chen | H03L 7/187 |
| 2020/0266968 A1* | 8/2020 | Liu | H03L 7/0807 |

(Continued)

*Primary Examiner* — Young T. Tse
(74) *Attorney, Agent, or Firm* — Lewis Roca Rothgerber Christie LLP

(57) ABSTRACT

A system and method of clock and data recovery. In some embodiments, the method includes: setting a bias signal source to a first bias value, the bias signal source being connected to an input of a voltage-controlled oscillator of a clock and data recovery circuit; determining that a locked signal of a frequency feedback signal source equals a first feedback value; setting the bias signal source to a second bias value, different from the first bias value; determining that a locked signal of the frequency feedback signal source equals a second feedback value; determining that the second feedback value meets a termination criterion; and setting an operating value of the bias signal source to the second bias value.

20 Claims, 4 Drawing Sheets

(56) References Cited

U.S. PATENT DOCUMENTS

2023/0049388 A1\* 2/2023 Zhai .......................... H04B 1/40
2023/0246800 A1\* 8/2023 Song ....................... H04L 7/033

\* cited by examiner

SYSTEM AND METHOD OF CLOCK AND DATA RECOVERY

CROSS-REFERENCE TO RELATED APPLICATION(S)

The present application claims priority to and the benefit of U.S. Provisional Application No. 63/454,596, filed Mar. 24, 2023, entitled "CDR FREQUENCY ACQUISITION-BASED DAC CALIBRATION", the entire content of which is incorporated herein by reference.

FIELD

One or more aspects of embodiments according to the present disclosure relate to serial data transmission, and more particularly to a system and method for bias adjustment in a clock and data recovery circuit.

BACKGROUND

In a serial data link, the clock may be separately transmitted, or embedded in the serial data. If the clock is embedded in the serial data, it may be recovered, from the data, by a receiver of the serial data link.

It is with respect to this general technical environment that aspects of the present disclosure are related.

SUMMARY

According to an embodiment of the present disclosure, there is provided a method, including: setting a bias signal source to a first bias value, the bias signal source being connected to an input of a voltage-controlled oscillator of a clock and data recovery circuit; determining that a locked signal of a frequency feedback signal source equals a first feedback value; setting the bias signal source to a second bias value, different from the first bias value; determining that a locked signal of the frequency feedback signal source equals a second feedback value; determining that the second feedback value meets a termination criterion; and setting an operating value of the bias signal source to the second bias value.

In some embodiments, the determining that the second feedback value meets a termination criterion includes determining that a difference between the second feedback value and a target value is less than a threshold.

In some embodiments, the frequency feedback signal source includes a digital to analog converter.

In some embodiments, the locked signal of the frequency feedback signal source is an input value of the digital to analog converter.

In some embodiments, the locked signal of the frequency feedback signal source is an output value of the digital to analog converter.

In some embodiments, the determining that the second feedback value meets a termination criterion includes determining that a difference between the second feedback value and a target value is less than the difference between the first feedback value and the target value.

In some embodiments, the frequency feedback signal source includes a digital to analog converter.

In some embodiments, the locked signal of the frequency feedback signal source is an input value of the digital to analog converter.

In some embodiments, the locked signal of the frequency feedback signal source is an output value of the digital to analog converter.

According to an embodiment of the present disclosure, there is provided a system, including: a clock and data recovery circuit including: a voltage-controlled oscillator; a bias signal source connected to an input of the voltage-controlled oscillator; a frequency feedback signal source connected to an input of the voltage-controlled oscillator; and a processing circuit configured to perform a method, the method including: setting the bias signal source to a first bias value; determining that a locked signal of the frequency feedback signal source equals a first feedback value; setting the bias signal source to a second bias value, different from the first bias value; determining that a locked signal of the frequency feedback signal source equals a second feedback value; determining that the second feedback value meets a termination criterion; and setting an operating value of the bias signal source to the second bias value. In some embodiments, the determining that the second feedback value meets a termination criterion includes determining that a difference between the second feedback value and a target value is less than a threshold.

In some embodiments, the frequency feedback signal source includes a digital to analog converter.

In some embodiments, the locked signal of the frequency feedback signal source is an input value of the digital to analog converter.

In some embodiments, the locked signal of the frequency feedback signal source is an output value of the digital to analog converter.

In some embodiments, the determining that the second feedback value meets a termination criterion includes determining that a difference between the second feedback value and a target value is less than the difference between the first feedback value and the target value.

In some embodiments, the frequency feedback signal source includes a digital to analog converter.

In some embodiments, the locked signal of the frequency feedback signal source is an input value of the digital to analog converter.

In some embodiments, the locked signal of the frequency feedback signal source is an output value of the digital to analog converter.

In some embodiments, the processing circuit is a finite state machine.

According to an embodiment of the present disclosure, there is provided a system, including: a clock and data recovery circuit including: a voltage-controlled oscillator; a bias signal source connected to an input of the voltage-controlled oscillator; a frequency feedback signal source connected to an input of the voltage-controlled oscillator; and means for processing configured to perform a method, the method including: setting the bias signal source to a first bias value; determining that a locked signal of the frequency feedback signal source equals a first feedback value; setting the bias signal source to a second bias value, different from the first bias value; determining that a locked signal of the frequency feedback signal source equals a second feedback value; determining that the second feedback value meets a termination criterion; and setting an operating value of the bias signal source to the second bias value.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for bias adjustment in a clock and data recovery circuit provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In a serial link using an embedded clock, the clock signal may be embedded in the serial data stream (in the sense that the phase and frequency of the clock signal may be determined from transitions in the data signal) and the clock may be recovered from the serial data stream, by a circuit that may be referred to as a clock and data recovery (CDR) circuit (or simply as a CDR).

Figure 1:
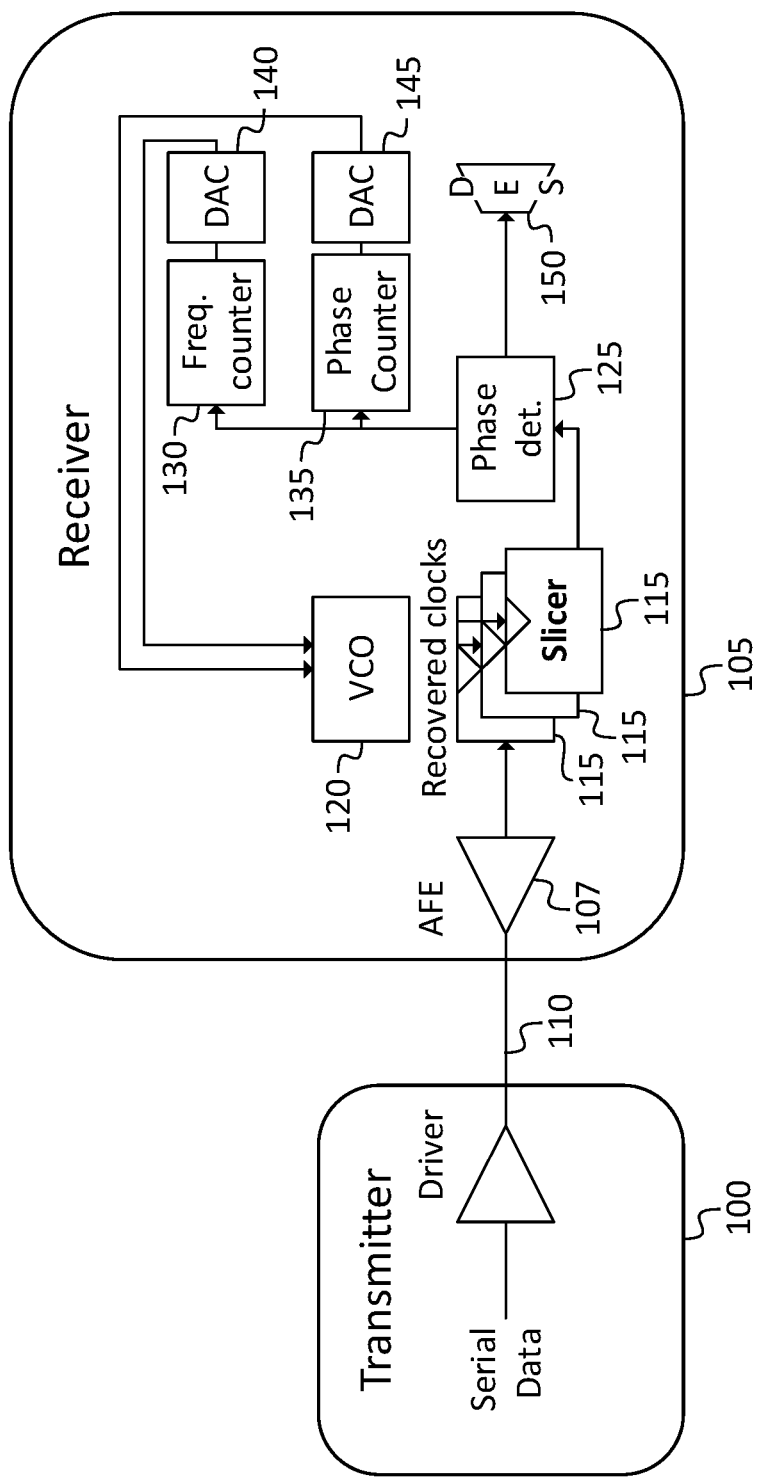
FIG. 1 is a block diagram of a portion of a clock and data recovery circuit, according to an embodiment of the present disclosure.

FIG. 1 shows a circuit including a serial transmitter 100 (at a distal end of a serial channel 110), a serial receiver 105 including an analog front end (AFE) 107 (at the proximal end of the serial channel 110), and a clock and data recovery circuit connected to the analog front end 107. In a clock and data recovery circuit, a voltage-controlled oscillator 120 may be used to generate a clock signal, and one or both of (i) a data clock and (ii) a crossing clock, which may be 90 degrees out of phase with the data clock, may be generated, by suitable phase shifts, from the clock signal at the output of the voltage-controlled oscillator. The data clock may be controlled, by the clock and data recovery circuit, to have a frequency substantially equal to the frequency of the clock embedded in the data stream and a phase such that transitions of the data clock fall substantially half-way between transitions in the data stream. The crossing clock may be controlled, by the clock and data recovery circuit, to have a frequency substantially equal to the frequency of the clock embedded in the data stream and a phase such that transitions of the data clock are substantially aligned with transitions in the data stream. These clocks (the data clock and the crossing clock) may be used to recover the clock embedded in the data stream, as discussed in further detail below.

The analog signal at the output of the analog front end 107 is fed to each of a plurality of slicers 115 (each of which may be a clocked comparator), including a data slicer and a crossing slicer. The crossing slicer 115 may be clocked by the crossing clock, which is controlled (as discussed in further detail below) to have transitions substantially aligned with transitions in the data stream. The data slicer 115 and the crossing slicer 115 may be connected to a phase detector, which may, e.g., operate as a bang-bang phase detector, and which may analyze data samples and determine whether each transition in the data is early or late, relative to the crossing clock. If the transition in the data is late relative to the crossing circuit, then the clock and data recovery circuit may adjust the frequency of the voltage-controlled oscillator 120 to be higher (causing the phase of the crossing clock to catch up to the phase of the data stream); if the transition in the data is early relative to the crossing circuit, then the clock and data recovery circuit may adjust the frequency of the voltage-controlled oscillator 120 to be lower (causing the phase of the data stream to catch up to the phase of the crossing clock).

The mechanism by which this is accomplished is illustrated in FIG. 1. The data slicer and the crossing slicer are connected to a phase and frequency detector 125 (labeled "Phase det." In FIG. 1 for brevity) which determines, at each data transition, whether the phase of the crossing clock is advanced or retarded relative to the phase of the data stream. The output of the phase and frequency detector 125 drives a frequency counter 130 and a phase counter 135, each of which drives a respective feedback signal source, e.g., a digital to analog converter (referred to as a frequency DAC 140 and a phase DAC 145, respectively). The outputs of the frequency DAC 140 and the phase DAC 145 are analog signals that are summed and fed to the voltage-controlled oscillator 120. As such, the control signal fed to the voltage-controlled oscillator 120 is influenced both (i) by the frequency error (which may be any discrepancy between the frequency of the clock embedded in the data stream and the frequency of the output of the voltage-controlled oscillator 120) and (ii) by the phase error (which may be any discrepancy between the phase of the clock embedded in the data stream and the phase of the crossing clock). FIG. 1 shows the outputs of the frequency DAC 140 and the phase DAC 145 fed as separate signals to the voltage-controlled oscillator 120; in such an embodiment these two analog signals may be summed inside the voltage-controlled oscillator 120. The clock and data recovery circuit may lock when this process reaches equilibrium. A deserializer (DES) 150 may convert the received serial digital data stream into parallel data.

The process of clock and data recovery circuit lock acquisition, which may also be referred to as clock and data recovery circuit "training", may be performed in two steps. In a first, initial (or "long" or "coarse") training step, the clock and data recovery circuit may lock onto the frequency of the incoming data stream, as described in further detail below, with reference to FIGS. 2-4. Periodic short (or "fine") training may then be performed to lock onto the phase of the incoming data stream.

The range of the frequency DAC 140 may be limited by hardware, e.g., by the characteristics of the circuit used to implement the frequency DAC 140. A larger DAC may support a greater range, but may include more hardware (e.g., more transistors, or larger transistors). A smaller DAC may consume less power, but may support a smaller range of data rates. In some embodiments, it is advantageous for the frequency DAC code (i.e., the digital signal at the input of the frequency DAC 140) to settle (i.e., to take a value, when the clock and data recovery circuit is locked) that is in the middle of its available range.

Figure 2:
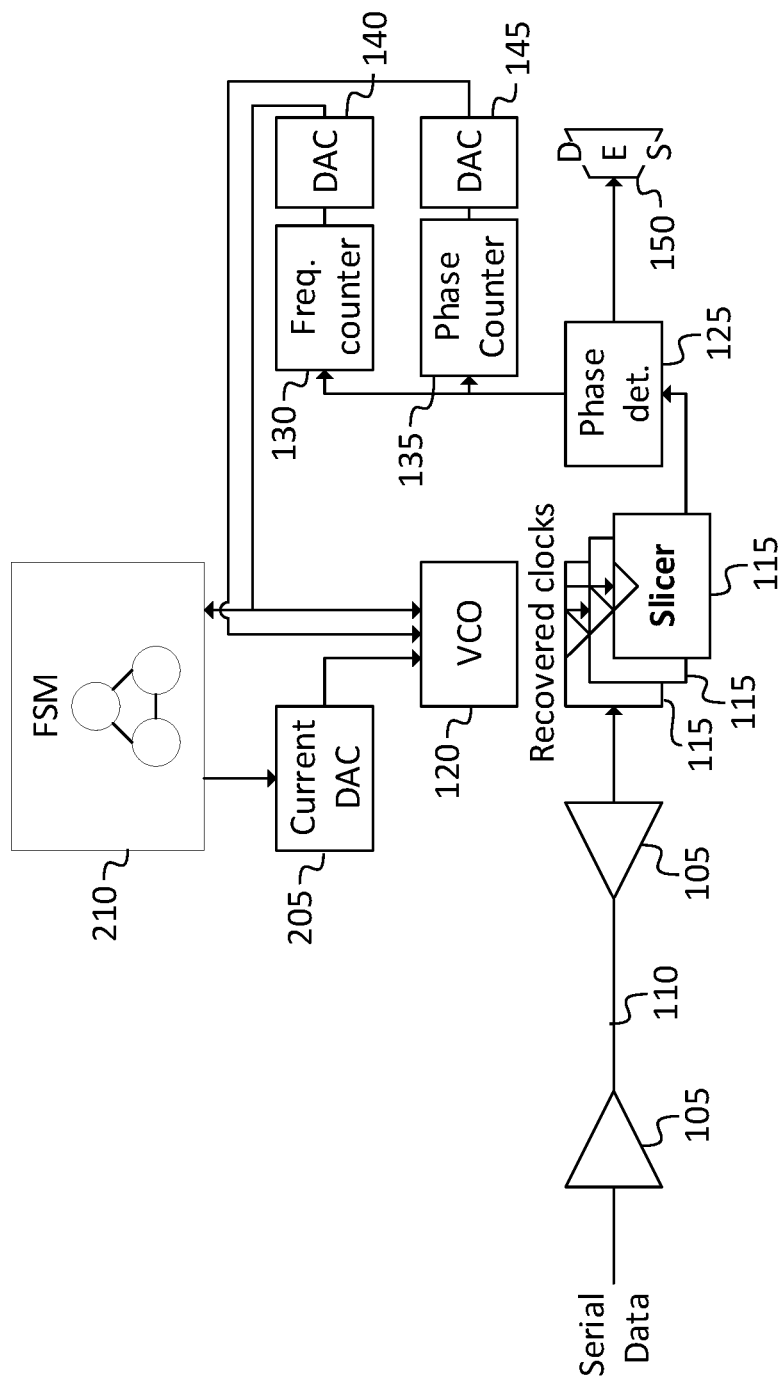
FIG. 2 is a block diagram of a portion of a clock and data recovery circuit, according to an embodiment of the present disclosure.

As such, in some embodiments, as illustrated in FIG. 2, a bias signal source 205 (e.g., a coarse, programmable band, digital to analog converter (e.g., a current DAC)) is added to the circuit, to put the code, when locked, of the frequency DAC 140 in the middle of its available range. When waking up from a low-power state, the factors that determine the bias value to which the bias signal source 205 is set when the frequency DAC 140 locks in the middle of its range may have changed while the clock and data recovery circuit was in the low-power state (e.g., the temperature (which may affect internal biases in the voltage-controlled oscillator 120) may have changed, or the frequency of the clock embedded in the data stream may have changed). As such, when waking up from the low-power state, it may be advantageous to adjust the bias value to which the bias signal source 205 is set.

Figure 3:
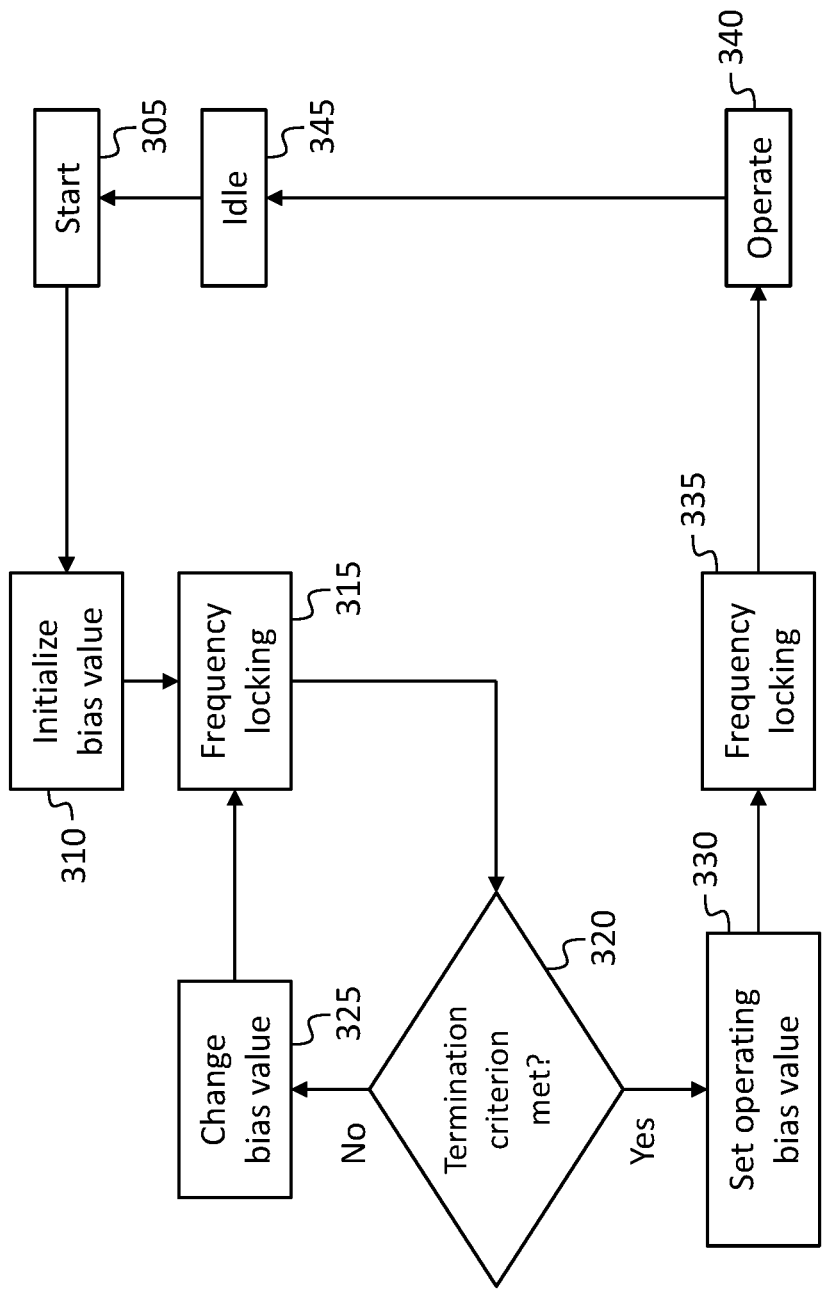
FIG. 3 is a flow chart of a method, according to an embodiment of the present disclosure.

In some embodiments, the bias value of the bias signal source 205 is set using frequency locking results. A method for performing the setting of the bias value of the bias signal source 205 is illustrated in FIG. 3 and may proceed as follows. At 305, the system may detect a request to perform (long) initial CDR training; at 310, the system may set the bias value of the bias signal source 205 to a first value, e.g., to an initial value (e.g., if the bias signal source 205 is a current DAC, it may set the DAC code of the current DAC (cDAC), to the minimum or maximum setting); and at 315, the system may perform frequency locking. At 320, the system may determine that a locked signal of a frequency feedback signal source (e.g., the frequency DAC 140) equals a first feedback value, the first feedback value being the input value (e.g., the code of the frequency DAC 140) or the output value (e.g., the output current of the frequency DAC 140) of the frequency feedback signal source in this circumstance. As used herein, a "locked signal of a frequency feedback signal source" is a signal (e.g., an input signal or an output signal) of the frequency feedback signal source when the clock and data recovery circuit is locked. The system may then, at 320, determine whether a termination criterion has been met. If the termination criterion has not been met, the system may return to step 325, and steps 325, 315, and 320 may be repeated until the termination criterion has been met, e.g., for a second bias value, for which the locked signal of the frequency feedback signal source equals a second feedback value. If the termination criterion has been met, the system may, at 330, set the operating value of the bias signal source to the bias value for which the termination criterion was met.

The termination criterion may be met, for example, if the locked signal of the frequency feedback signal source is within a threshold of a target value (i.e., the difference between the second feedback value (e.g., the code of the frequency DAC 140) and a target value (e.g., the mid-range code) is less than a threshold. As used herein, "the difference between" a first quantity and a second quantity means the absolute value of (the first quantity minus the second quantity) or, equivalently, the result of subtracting the smaller of the two quantities from the larger of the two quantities. In another embodiment, the termination criterion may be met when the difference between the second feedback value and the target value is smallest (e.g., when the difference between the second feedback value and the target value is smallest, it follows that the difference between the second feedback value and the target value is less than the difference between the first feedback value and the target value).

At 330, as mentioned above, the system may set the operating value of the bias signal source to the bias value for which the termination criterion was met; at 335 the system may perform frequency locking, and at 340, the system may operate (e.g., receive serial data), until, at 345, the system may transition to an idle (e.g., low-power) state.

Figure 4:
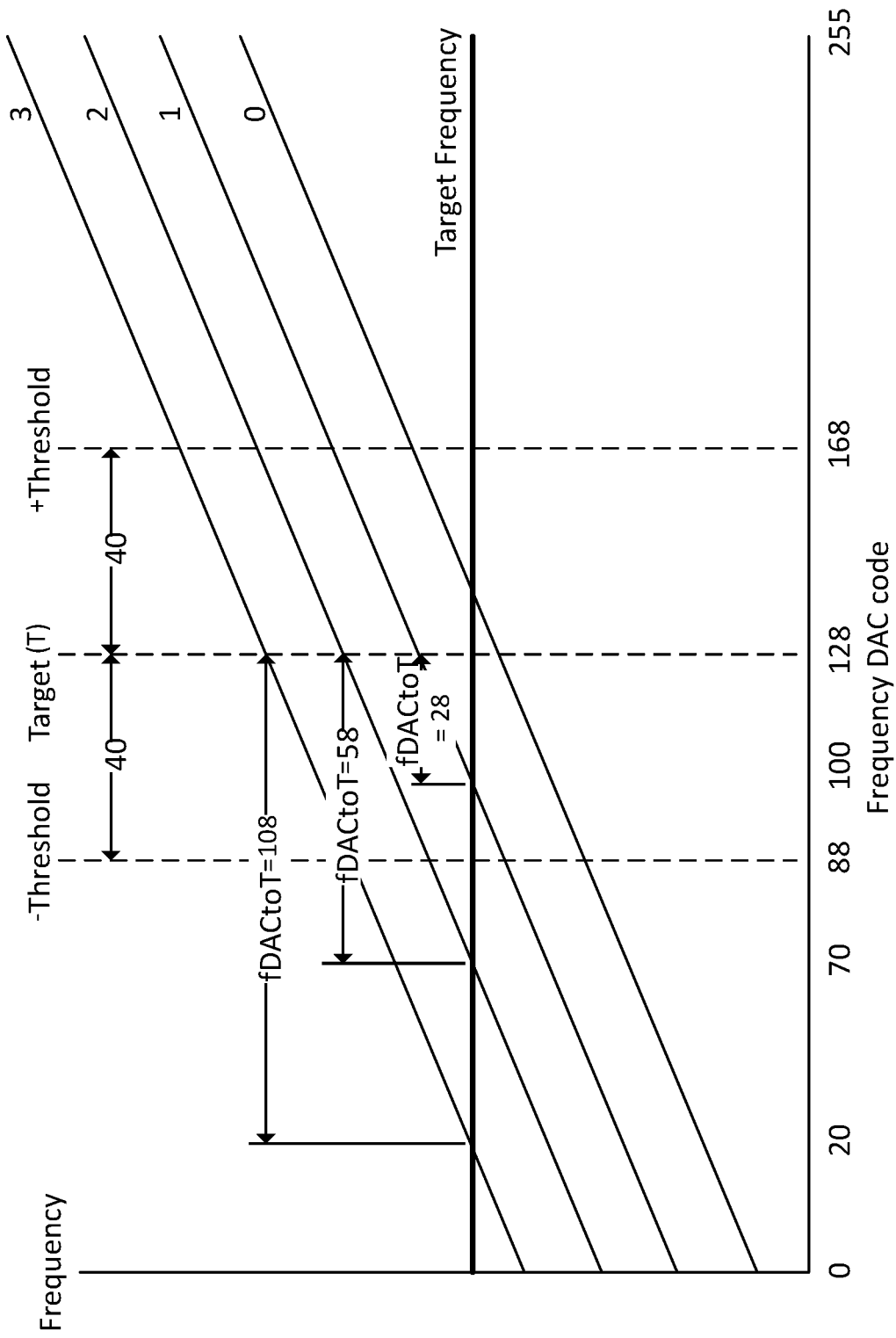
FIG. 4 is a graph of frequency as a function of an input code, according to an embodiment of the present disclosure.

FIG. 4 is a graph showing four diagonal lines, each of which is a graph of the frequency of the voltage-controlled oscillator 120 as a function of the input (the "Frequency DAC code") of the frequency DAC 140, for a respective value of four different values of the bias signal source 205 setting (labeled "0", "1", "2", and "3" at the upper right end of the four corresponding diagonal lines). It may be seen that when the bias value of the bias signal source 205 is 3, 2, or 1, the input of the frequency DAC 140, when the clock and data recovery circuit is locked, differs from the target value (128) by an amount (labeled fDACtoT) of 108, 58, or 28, respectively. If the threshold is set to 40 (e.g., an input value for the frequency DAC 140 when locked may differ from the target by up to 40), then a value of either 0 or 1 as the bias value results in the input value for the frequency DAC 140 being within the threshold of the target when the clock and data recovery circuit is locked.

Referring again to FIG. 2, a processing circuit (or means for processing), e.g., a finite state machine 210 may be employed to implement the method illustrated in FIG. 3. The finite state machine 210 may monitor the input or the output of the frequency DAC 140 while adjusting the bias signal source 205, and continue adjusting the bias value of the bias signal source 205 until the termination criterion is met.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., $(1-35/100)$ times 10) and the recited maximum value of 13.5 (i.e., $(1+35/100)$ times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

It will be understood that when an element is referred to as being "directly connected" or "directly coupled" to another element, there are no intervening elements present. As used herein, "generally connected" means connected by an electrical path that may contain arbitrary intervening elements, including intervening elements the presence of which qualitatively changes the behavior of the circuit. As used herein, "connected" means (i) "directly connected" or (ii) connected with intervening elements, the intervening elements being ones (e.g., low-value resistors or inductors, or short sections of transmission line) that do not qualitatively affect the behavior of the circuit.

Although exemplary embodiments of a system and method for bias adjustment in a clock and data recovery circuit have been specifically described and illustrated herein, many modifications and variations will be apparent to those skilled in the art. Accordingly, it is to be understood that a system and method for bias adjustment in a clock and data recovery circuit constructed according to principles of this disclosure may be embodied other than as specifically described herein. The invention is also defined in the following claims, and equivalents thereof.

What is claimed is:

1. A method, comprising:
    setting a bias signal source to a first bias value, the bias signal source being connected to an input of a voltage-controlled oscillator of a clock and data recovery circuit;
    determining that a locked signal of a frequency feedback signal source equals or exceeds a first feedback value;
    determining that the first feedback value does not meet a termination criterion;
    setting the bias signal source to a second bias value, different from the first bias value;
    determining that the locked signal of the frequency feedback signal source equals or exceeds a second feedback value;
    determining that the second feedback value meets the termination criterion; and
    based on determining that the second feedback value meets the termination criterion, setting an operating value of the bias signal source to the second bias value for the voltage-controlled oscillator of the clock and data recovery circuit.

2. The method of claim 1, wherein the determining that the second feedback value meets the termination criterion comprises determining that a difference between the second feedback value and a target value is less than a threshold.

3. The method of claim 2, wherein the frequency feedback signal source comprises a digital to analog converter.

4. The method of claim 3, wherein the locked signal of the frequency feedback signal source is an input value of the digital to analog converter.

5. The method of claim 3, wherein the locked signal of the frequency feedback signal source is an output value of the digital to analog converter.

6. The method of claim 1, wherein the determining that the second feedback value meets the termination criterion comprises determining that a difference between the second feedback value and a target value is less than the difference between the first feedback value and the target value.

7. The method of claim 6, wherein the frequency feedback signal source comprises a digital to analog converter.

8. The method of claim 7, wherein the locked signal of the frequency feedback signal source is an input value of the digital to analog converter.

9. The method of claim 7, wherein the locked signal of the frequency feedback signal source is an output value of the digital to analog converter.

10. A system, comprising:
a clock and data recovery circuit comprising:
  a voltage-controlled oscillator;
  a bias signal source connected to a first input of the voltage-controlled oscillator;
  a frequency feedback signal source connected to a second input of the voltage-controlled oscillator; and
  a processing circuit configured to perform a method, the method comprising:
    setting the bias signal source to a first bias value;
    determining that a locked signal of the frequency feedback signal source equals or exceeds a first feedback value;
    determining that the first feedback value does not meet a termination criterion;
    setting the bias signal source to a second bias value, different from the first bias value;
    determining that the locked signal of the frequency feedback signal source equals or exceeds a second feedback value;
    determining that the second feedback value meets the termination criterion; and
    based on determining that the second feedback value meets the termination criterion, setting an operating value of the bias signal source to the second bias value for the voltage-controlled oscillator of the clock and data recovery circuit.

11. The system of claim 10, wherein the determining that the second feedback value meets the termination criterion comprises determining that a difference between the second feedback value and a target value is less than a threshold.

12. The system of claim 11, wherein the frequency feedback signal source comprises a digital to analog converter.

13. The system of claim 12, wherein the locked signal of the frequency feedback signal source is an input value of the digital to analog converter.

14. The system of claim 12, wherein the locked signal of the frequency feedback signal source is an output value of the digital to analog converter.

15. The system of claim 10, wherein the determining that the second feedback value meets the termination criterion comprises determining that a difference between the second feedback value and a target value is less than the difference between the first feedback value and the target value.

16. The system of claim 15, wherein the frequency feedback signal source comprises a digital to analog converter.

17. The system of claim 16, wherein the locked signal of the frequency feedback signal source is an input value of the digital to analog converter.

18. The system of claim 16, wherein the locked signal of the frequency feedback signal source is an output value of the digital to analog converter.

19. The system of claim 10, wherein the processing circuit is a finite state machine.

20. A system, comprising:
a clock and data recovery circuit comprising:
  a voltage-controlled oscillator;
  a bias signal source connected to a first input of the voltage-controlled oscillator;
  a frequency feedback signal source connected to a second input of the voltage-controlled oscillator; and
  means for processing configured to perform a method, the method comprising:
    setting the bias signal source to a first bias value;
    determining that a locked signal of the frequency feedback signal source equals or exceeds a first feedback value;
    determining that the first feedback value does not meet a termination criterion;
    setting the bias signal source to a second bias value, different from the first bias value;
    determining that the locked signal of the frequency feedback signal source equals or exceeds a second feedback value;
    determining that the second feedback value meets the termination criterion; and
    based on determining that the second feedback value meets the termination criterion, setting an operating value of the bias signal source to the second bias value for the voltage-controlled oscillator of the clock and data recovery circuit.

\* \* \* \* \*